INVENTORS
SAUL LEVINE
WILLIS FORD KARR

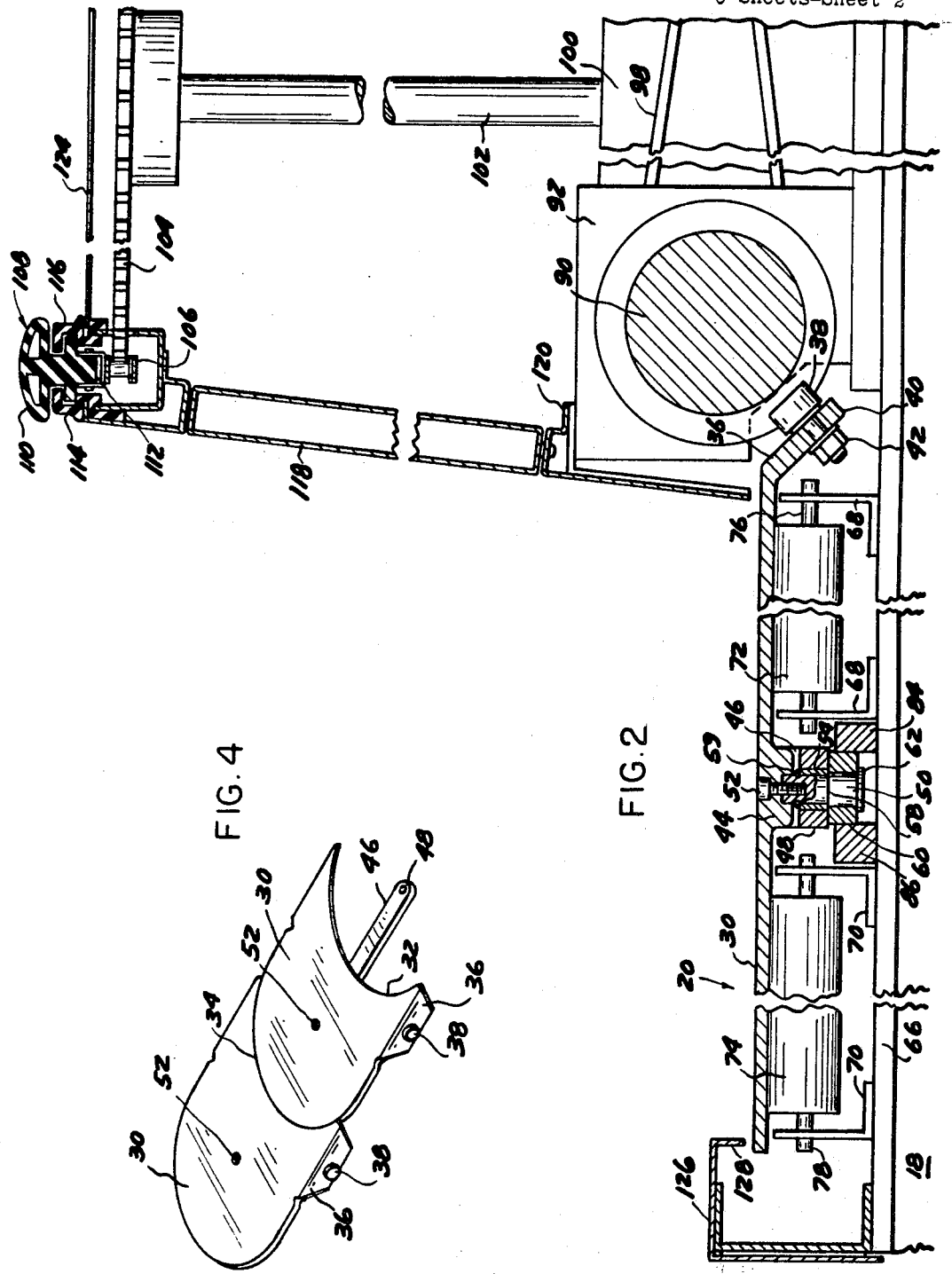

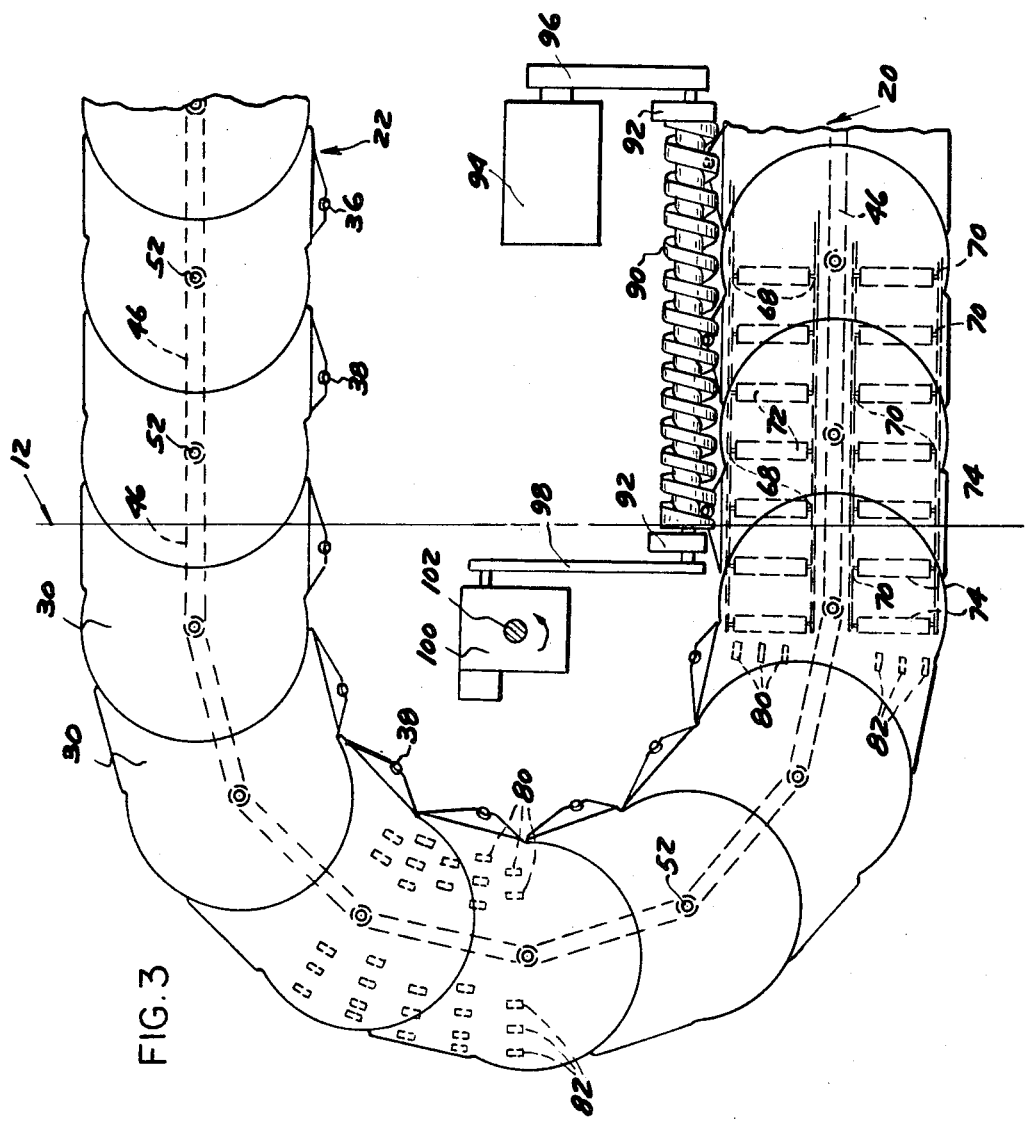

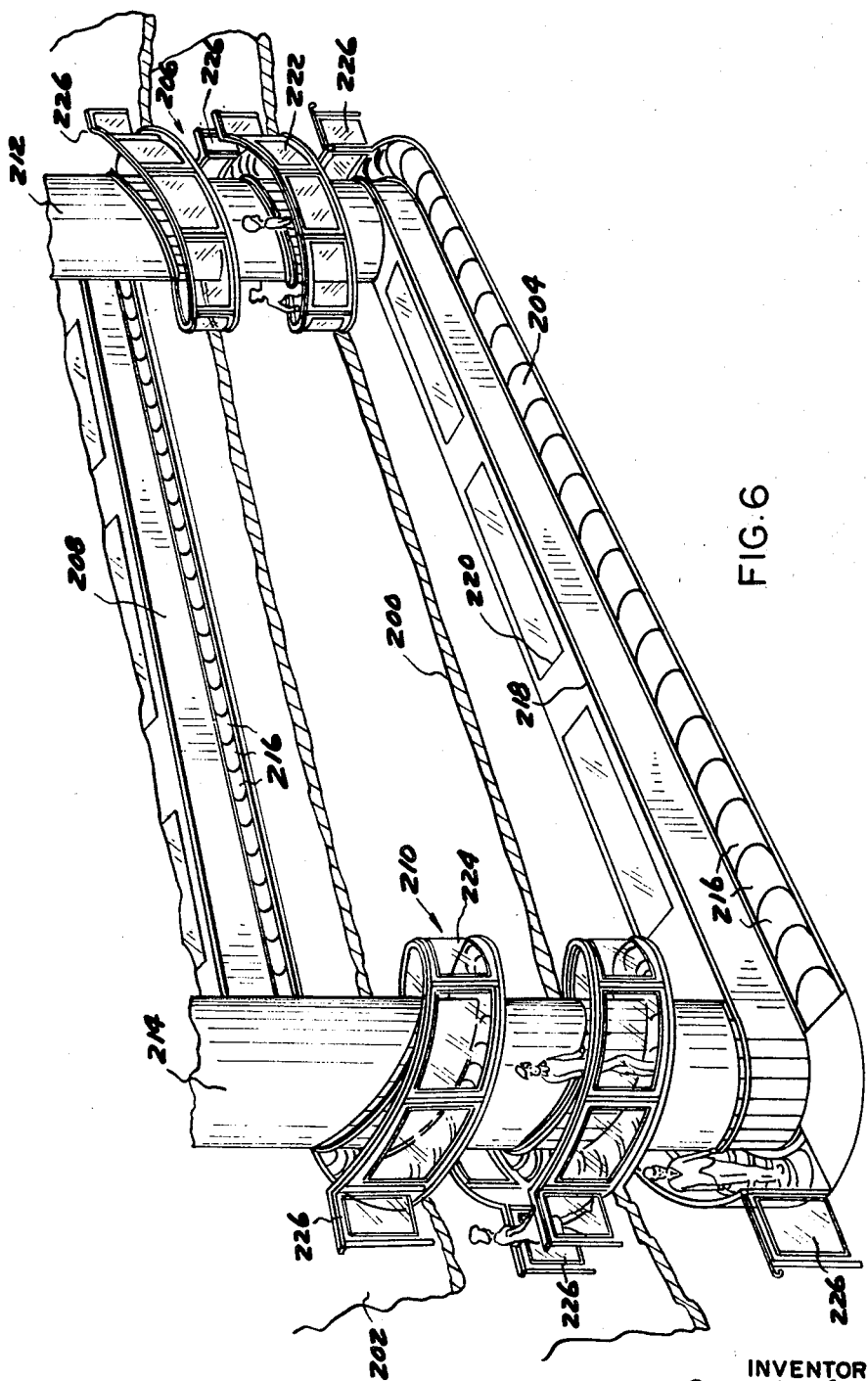

Aug. 6, 1968 W. F. KARR ET AL 3,395,648
MOVING SIDEWALK
Filed June 4, 1965 6 Sheets-Sheet 5
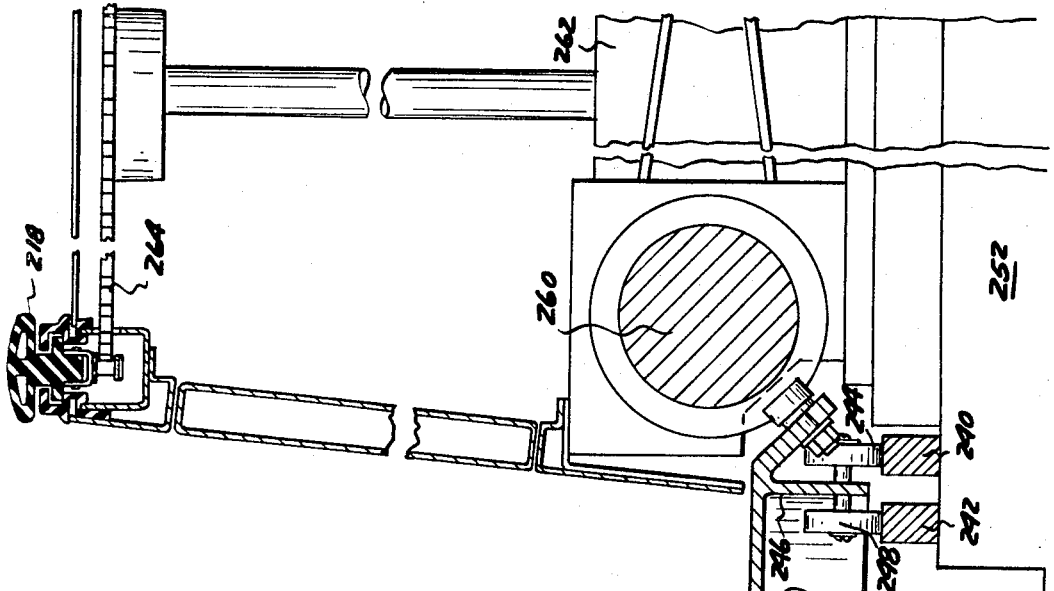
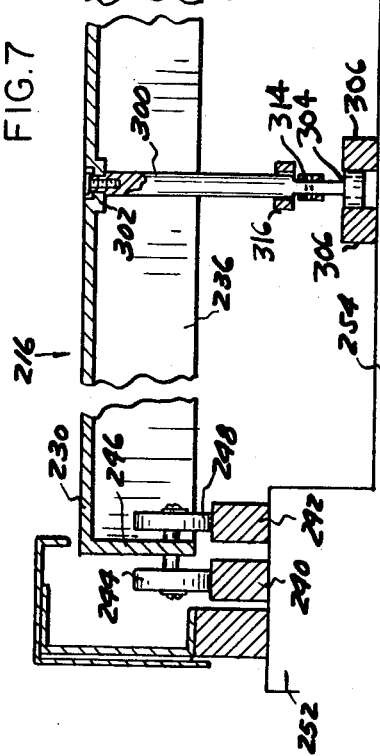
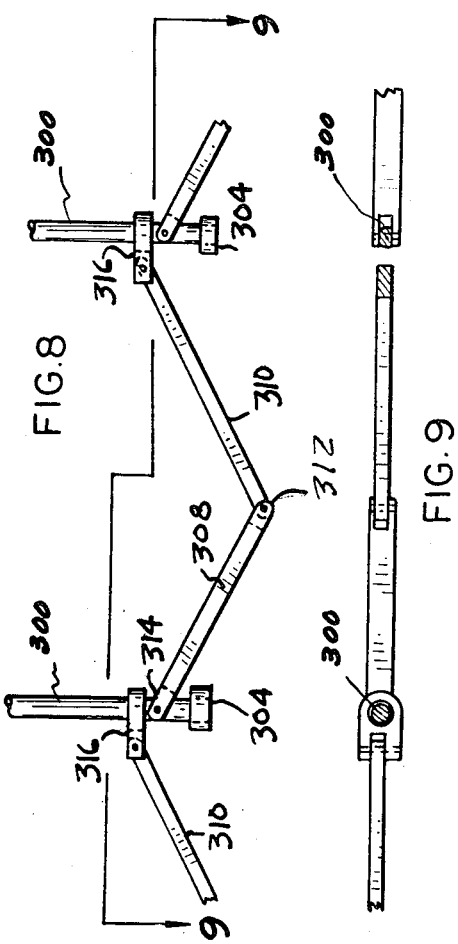
INVENTORS
SAUL LEVINE
WILLIS FORD KARR
BY
ATTORNEY Aug. 6, 1968    W F. KARR ET AL    3,395,648
MOVING SIDEWALK Filed June 4, 1965    6 Sheets-Sheet 6

INVENTORS
SAUL LeVINE
WILLIS FORD KARR

BY *(signature)*
ATTORNEY

United States Patent Office 3,395,648
Patented Aug. 6, 1968

3,395,648
MOVING SIDEWALK
Willis Ford Karr, Warren, and Saul Le Vine, Southfield, Mich., assignors, by direct and mesne assignments, to Federal Engineering Company, Detroit, Mich., a corporation of Michigan
Continuation-in-part of application Ser. No. 423,267, Jan. 5, 1965. This application June 4, 1965, Ser. No. 461,232
8 Claims. (Cl. 104—25)

This application is a continuation-in-part of United States patent application Ser. No. 423,267, filed on Jan. 4, 1965 and now Patent No. 3,314,517. Like that application, it relates to powered conveyors adapted to move people or articles along various horizontal or inclined paths.

While the present invention is applicable to conveyors for moving articles between remote points, it is particularly designed and adapted for use as a so-called "moving sidewalk" for carrying pedestrians between separated areas. The utility of powered sidewalks for moving pedestrians between separated areas is readily apparent. Particularly in public places such as airports and other transportation terminals, retail shopping centers and theaters, such devices provide many important advantages aside from their convenience to the pedestrian. First, they create greater architectural freedom in the planning of such public places. For example, the sizes of certain shopping centers and air terminals are practically limited by the maximum comfortable distance that a pedestrian can walk between extreme borders of the place. The use of powered sidewalks greatly expands the area conveniently available for the construction of such buildings. Another advantage lies in the increase in the density of pedestrian flow which is achievable with moving sidewalks. In transportation terminals such as subways, the use of moving sidewalks allows a higher density of pedestrian traffic to be achieved and this allows the use of smaller passageways to accommodate the same number of pedestrians. A third advantage is the ability to channel pedestrian flow. For example, in a shopping center, it is desirable to move pedestrians past as many display areas as is convenient and comfortable. The use of a moving sidewalk as a perimeter belt transportation system would provide means for carrying shoppers past a maximum number of retail displays.

The present invention therefore contemplates a conveyor of the moving sidewalk type which provides the above advantages. It is particularly addressed to such a device which takes a unique form and provides many adjunct advantages.

One of the important aspects of the present invention lies in the low height of the conveyor section. The sidewalks formed in accordance with the present invention are designed and arranged so that the entire system, including the driving mechanism may be supported on top of an existing grade without the necessity of any excavation. In such an above-grade installation the moving platform need only be a few inches above the surrounding level so that relatively short, gradually inclined ramps may be used to provide access and egress from the conveyor to the existing grade. This arrangement appreciably reduces the cost of installation of the present system with respect to systems of the prior art and makes the present units adaptable to situations in which moving sidewalks may only be required in a particular location for a limited period of time.

Another aspect of the present invention, which assists in achieving the low silhouette, as well as other advantages, is utilization of a unique form of passenger supporting pallet. This pallet consists of a flat plate having two parallel opposed sides and connecting back and front sides in the form of concave and convex semi-circles, respectively. The pallets are supported in a track which defines the path of the conveyor and are free to rotate about the center of the convex section above the track. The successive pallets are connected by links which have a connection that provides a freedom of movement in the horizontal plane. In traversing a curve the pallets rotate with respect to one another so that the concave and convex surfaces rotate with respect to one another but their configuration prevents any gap from opening between the pallets. This unique configuration allows the conveyor to traverse relatively sharp curves, to return in a closed loop so as to provide transportation in two directions and to be connected in an upward spiral to form an escalator.

In a first preferred embodiment of the invention, which will subsequently be described in detail, the pallets are driven by means of rollers disposed on one of their edges which engage a screw having its axis disposed parallel to the path of the driving section of the conveyor. The screw is adapted to engage the rollers on a pair of adjoining platforms at the same time so as to pull the chain of platens in one direction and push it in the opposite direction. In the preferred embodiment the rollers are pulled on arms which are inclined downwardly with respect to the platen so as to preserve the low configuration of the platens and allow platens to traverse corners without having the rollers abutting the adjacent platens.

The pallets are supported on top of stationary rolls which receive the full weight of a person standing on the pallets. The stationary rolls are supported for rotation about axes transverse to the direction of motion of the conveyor and in curved sections a plurality of short, independent roller sections are used to minimize the scraping because of differential action. The necessary support height of the stationary rolls and the thickness of the platens dictates the minimum height of the platens and provides for easy access thereto.

When the conveyor is used in a race track configuration to provide a pair of straightaways moving in opposite directions, an elevated center section may be provided as a division between the two straightaways. This elevated section is designed to contain merchandise displays for view by passengers on the conveyors as well as pedestrians on the surrounding grade. In the first preferred embodiment a hand rail formed of a continuous plastic or rubber extrusion is suported on the upper surface of this median to provide support for passengers on the pallets. The first embodiment of the invention provides uprights on the pallets which may be used as back rests and parcel supports and which include foldable seat members on the longer rides.

A second embodiment of the present invention, which will also be disclosed in detail, consists of a variation in the form of the pallets which allows them to maintain their horizontal orientation when moving along an incline, in the same manner as an escalator. The first embodiment of the invention, wherein the surfaces of the pallets assume the same inclination as the grade at which they are traversing is useful for relatively mild grades, such as less than ten percent. When steeper grades are encountered, it is advisable to provide a pallet configuration which remains horizontal at all times. The pallets of the second embodiment have an upper surface formed in the same manner as the pallets of the first embodiment; that is, with one concave edge and one convex edge to allow them to mate with the adjoining pallets while passing through curves. The supporting mechanism for the pallets consists of a forward pair of wheels which extend downwardly from the pallet at each side thereof and a rear pair of wheels which are spaced closer to one another and extend downwardly from the rear edges of the pallet. The pallet is supported by these wheels on an outer track, which engages the forward wheels and an inner track which engages the rear wheels. While moving on the horizontal both of the tracks are horizontal and they become inclined, as the pallets move between levels. When the pallets are moving upwardly the forward track drops below the rear track and the reverse occurs when the pallets move downwardly.

This second embodiment of the invention contemplates the pallets may move spirally upward or downward to minimize the space requirements of the unit. This ability of movement in the horizontal or to turn in the horizontal plane and move at an inclination with respect to the horizontal plane provides a variety of important advantages which are not present in the prior art.

It is therefore seen to be a primary object of the present invention to provide a conveyor which may be supported on existing grade levels and has a very low silhouette so that the access ramps may have gentle inclinations and no excavation need be made to install the unit.

Another object is to provide such a conveyor which is capable of rounding corners in a horizontal plane without opening any gap between successive pallets and which is also capable of moving on the incline with the pallets maintained horizontally in the manner of an escalator, and is further capable of moving both at inclines with respect to the horizontal and about curves in the horizontal plane simultaneously so as to achieve a spiral elevating operation.

Still another object is to provide such a conveyor which is simple in construction so as to be low in cost and reliable in operation.

Other objects, advantages and applications of the present invention will be made apparent by the following detailed description of the preferred embodiments of the invention. The description makes reference to the accompanying drawings in which:

FIGURE 2 is a sectional view taken along line 2—2 of FIGURE 1 and providing a vertical section through the conveyor;

FIGURE 3 is a sectional plan view of one end of the conveyor of FIGURE 1 taken along line 3—3 of FIGURE 1;

FIGURE 4 is a top perspective view of a pair of pallets employed in the embodiment of FIGURE 1;

FIGURE 6 is a perspective view of a conveyor section including escalator sections which constitutes a second embodiment of our invention;

FIGURE 7 is a transverse sectional view through a straightaway of the embodiment of FIGURE 6;

FIGURE 8 is a detailed sectional view through one of the universal joints that couples the pallets of the embodiment of FIGURE 6 together;

FIGURE 9 is a detailed sectional view transverse to the view of FIGURE 8, taken along lines 9—9 of FIGURE 8;

Figure 1:
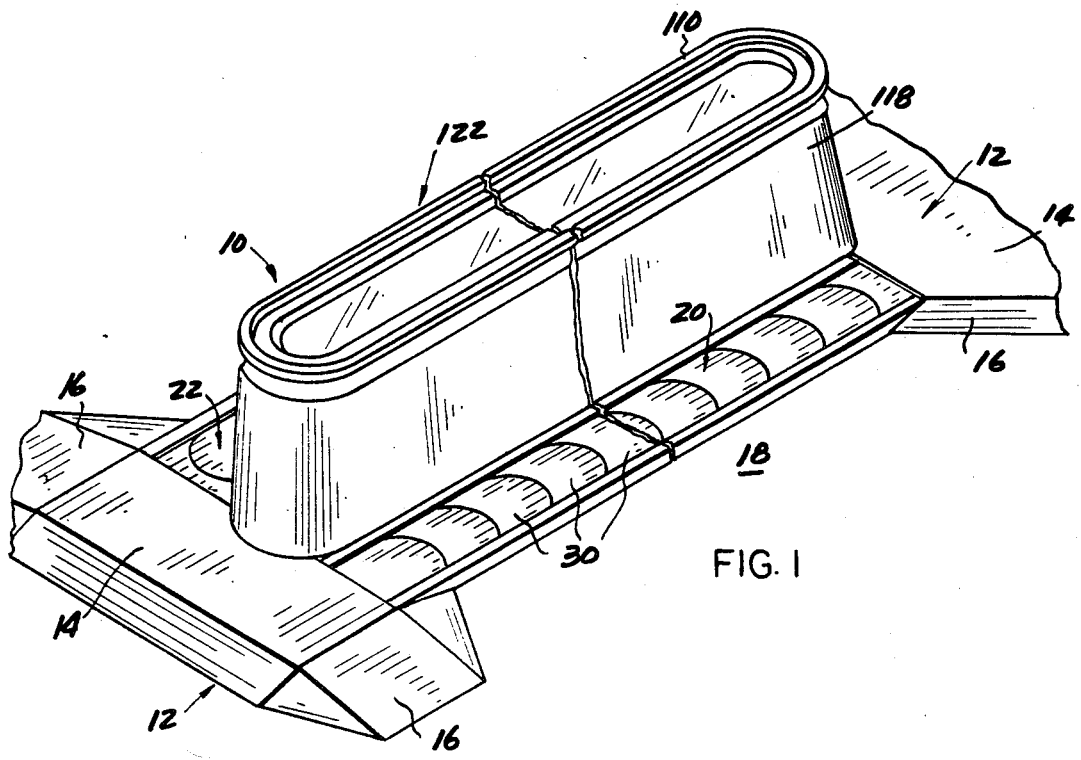
FIGURE 1 is a perspective view of a single, closed loop conveyor section representing a first preferred embodiment of our invention.
Figure 5:
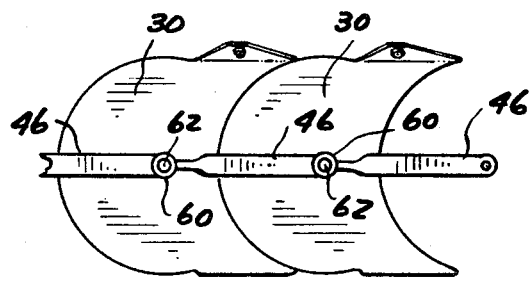
FIGURE 5 is a bottom perspective view of a pair of the pallets used in connection with the first embodiment of the present invention.
Figure 10:
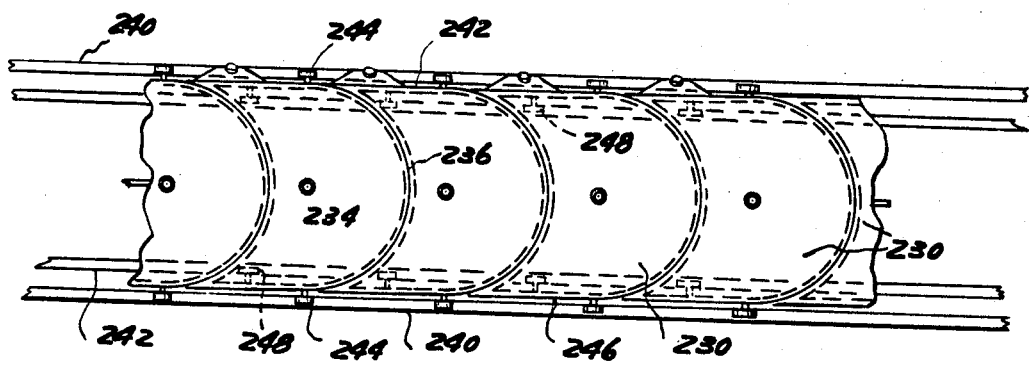
FIGURE 10 is a plan view of a section of an elevated section of the embodiment of FIGURE 6.

Referring to the drawings, FIGURE 1 pictorially illustrates one complete, closed loop section of a first embodiment of the moving sidewalk conveyor, generally indicated at 10. The length of a particular section is not important to the present invention and the unit 10 is shown broken away in its middle to indicate an indeterminate length. It will be noted that each end of a sidewalk section terminates in a stationary platform, generally indicated at 12. Each platform consists of a horizontal section 14 joined by a plurality of inclined sections 16 to an existing grade level 18. A plurality of conveyor sections 10 may be joined together with stationary platforms 12 serving as terminals and to connect the conveyor sections so that pedestrians may cross the general line of travel of the conveyor at the stationary platforms.

The section 10 connects the two end platforms 12 with a first conveyor section, generally indicated at 20, which moves in one direction and a second conveyor section, generally indicated at 22, which moves in the other direction. The two sections of the same closed loop conveyor line are formed of a plurality of pallets 30, which are exposed in the straightaway sections 20 and 22 and move under the platforms 12 in semi-circular return paths at the end sections.

Each pallet 30 consists of a flat plate having a pair of parallel sides joined at one end by a semi-circular, concave surface 32 and at the other end by a semi-circular convex surface 34. One of the straight sides has a projection 36 which is bent downwardly at a forty-five degree angle and has a central hole which rotatably supports a cam follower 38. The cam follower is rotatably fixed on a shaft 40 which passes through the aperture in the projection 36 and is retained by a bolt 42 which threads on the underside of the shaft 40.

On its underside each pallet 30 has a central boss 44 which is located at the center of the convex semi-circular edge 34. An elongated connecting link 46 having a length approximately equal to the distance between the center of the convex edge 34 and the concave edge 32 of a single pallet 30 is attached to the boss and projects from it in the direction of the concave surface 32, parallel to the top surface of the pallet 30 and slightly below it. The link 46 terminates at its extreme end in a rounded section 48 having a central aperture. This section 48 is rotatably journalled on a pin 50 which projects downwardly from the boss 44 of the next pallet adjacent to the concave surface 32.

The pins 50 are retained in the bosses 44 by means of bolts 52 which pass through the center of the boss and are threaded in blind holes formed in one end of the pins. A sleeve bearing 54 surrounds that section of the pin which journals the end 48 of the link 46, to lower the friction of the connection. The bearing 54 is retained on the pin 50 between a shoulder 58 and a split ring 59. The pin 50 also retains a rotatable follower member 60 directly below the link end 48. The follower is retained at its lower end by a flange 62 formed at the extreme lower end of the pin.

The links 46 join the pallets 30 into a closed loop chain wherein each element is rotatable, in one plane, with respect to its two adjacent members. Since the centers of rotation are located at the centers of the convex surfaces 34, a rotation of the members simply causes a slipping of a concave surface of one member with respect to the adjacent concave surface of the next member, and does not open any gaps between adjacent pallets 30.

The pallets are supported on a flat base 66 which is adapted to be rested on the grade 18. The base 66 supports a number of inner angle brackets 68 and outer angle brackets 70 which are disposed in two pairs and arrayed at regular intervals along the length of the conveyor. In the straightaway sections the brackets 68 and 70 retain inner stationary rolls 72 and outer stationary rolls 74 which are arrayed with their respective shafts 76 and 78 in a horizontal position, perpendicular to the direction of motion of the pallet sections 30. In the curved sections the shafts 76 and 78 retain pluralities of separate segmented wheels 80 and 82 which replace the stationary rolls 72 and 74 to allow for the radially outer sections of the pallets 30 to move at a greater speed than the inner sections in traversing the curve.

A guide, consisting of a split pair of sections 84 and 86, is supported on top of the base 66 down the center of the path of the conveyor pallets 30. The guide halves 84 and 86 have their opposed surfaces separated by approximately the diameter of the followers 60 supported on the underside of the pallets 30 and these followers 60 are journalled between the guide sections to direct the pallets 20 along the conveyor path.

The pallets 30 are driven along the conveyor path, as dictated by the guides 84 and 86, through the cam followers 38 supported on the projections 36. The followers 38 engage a horizontally aligned drive screw 90 which is supported adjacent to the inner end of the conveyor path at some point along one of the straight sections. The screw 90 has a thread which is adapted to engage the cam followers 38 as they arrive in its area and to move them along its length. The length of the screw is such that at least two followers 38 are engaged in its threads at any one time. The rear follower which is engaged tends to pull the chain of pallets 30 and the forward follower tends to push the chain. Effectively power is thus applied to the chain at two points. This tends to decrease any gap which might be formed between adjacent pallets 30 by some elongation in the chain as might be caused by wear betwen moving parts or temperature effects, since such gaps tend to be split between the pushed sections and the pulled sections.

The screw 90 is supported on a pair of journal blocks 92 and is rotated by an electric motor 94 acting through a belt drive 96 on one end of the screw. The other end of the screw is connected by a second belt drive 98 to a right angle drive 100. The output of the drive 100 is provided through a vertical shaft 102 which is disposed mid-way between the two straightaway paths of the conveyor, at the center of one of the semi-circular end sections. A large bull gear 104 is connected to the upper end of the shaft 102.

The gear 104 is in driving engagement with a continuous chain 106 which is fixed below a plastic extruded hand rail, generaly indicated at 108. The hand rail has an upper hand engaging section 110 and a lower driving section 112 which is journalled between a pair of rails 114 and 116. The outer rail 114 is supported on the upper end of a partitioned wall 118 which rises upwardly, at an inclined angle, from a center unit 120 that is supported on a base 66. The pair of opposed sidewalls 118 form a center partition generaly indicated at 122 having a top surface 124 that extends between a pair of the extrusions 116 on opposed sides. As has been noted in the previous patent application, this central partition may be provided with display areas by forming it with cabinets.

The conveyor section 10 is completed by side panel members 126 which extend upwardly from the outer edges of the base 66 along the straightaways and have downwardly turned lips 128 that project just above the external edges of the pallets 30.

It is thus seen that the conveyor section 10 has an extremely low profile with the top surfaces of the pallets 30 being raised above the grade 18 by only a few inches more than the diameter of the stationary rolls 72 and 74. The conveyor section is completely self-contained and may be supported on its base 66 without any excavation or installation with respect to the existing grade.

The curved sections need not be covered by the platforms 12 nor need the entire unit be formed in a closed race track. Rather, they may be formed in any required configuration and may also extend up reasonable grades such as ten to twelve degrees.

A second embodiment of the invention, disclosed in FIGURES 6–12, provides a conveyor section wherein the surfaces of the pallets may be maintained horizontally even when traversing an incline. This allows the device to act either as a horizontal conveyor or as an escalator.

FIGURE 6 discloses a specific arrangement of the second embodiment of the invention wherein the conveyor provides transportation along and between two floor levels, a lower level 200 and an upper level 202. One elongated section 204 moves in a first direction on the lower level 200, rises in a spiral escalator arrangement generally indicated at 206, to the upper level 202, then moves in the opposite direction to the section 204 along a straightaway section 208 and returns downwardly to the lower level 200 in a second spiral escalator arrangement 210.

The spiral escalator arrangements 206 and 210 are built around columns 212 and 214 respectively. The spiral inclines are so sharp that it would be difficult for passengers to use them if the surfaces of the pallets of the conveyor assumed the same inclination as was being traversed by the conveyor. Accordingly, the second embodiment of the invention provides a variation of the first embodiment, wherein the pallets have a degree of freedom in the vertical direction with respect to one another so that the surfaces of the pallets may remain horizontal while the pallets traverse an incline.

The straightaways 204 and 208 and the spiral escalator configurations 206 and 210 all employ one continuous, closed loop, pallet train consisting of interconnected pallets 216. A hand rail 218 parallels the pallets' path. The hand rail 218 spirals about the surfaces of the columns 212 and 214 in the escalator sections. Adjacent to the straightaways 204 and 208, the hand rail 218 is supported on vertical members 220 and 221 respectively which are the equivalent of the median separation 122 of the first embodiment. Side walls 222 and 224 provide exits 226 and 228 respectively at intermediate levels as well as at the lower and upper levels 204 and 208.

The modifications which are made in the first embodiment to arrive at the second embodiment are illustrated in FIGURE 7 which is a transverse cross-section through a straightaway, similar to FIGURE 2. The upper surfaces 230 of the pallets 216 are shaped in the same manner as the pallets 30 with convex forward edges 232 and concave rearward edges 234. Both the forward and rear edges 232 and 234 have downwardly turned lips 236 and 238 respectively. These lips allow the pallets to rise or fall with respect to one another without opening any gaps between adjacent units.

The pallets are supported on a pair of outer tracks 240 and a pair of inner tracks 242. The outer tracks 240 engage a pair of forward wheels 244 which are supported below the surface 230 of the pallet on down turned side lips 246. The inner tracks 242 support a pair of rear wheels 248 which are journalled for rotation about horizontal axes on the interior side of the lip 246 adjacent to the rear of the pallet 216. The tracks 240 and 242 are in turn supported on mounts 250 and 252 above a base 254.

Figure 11:
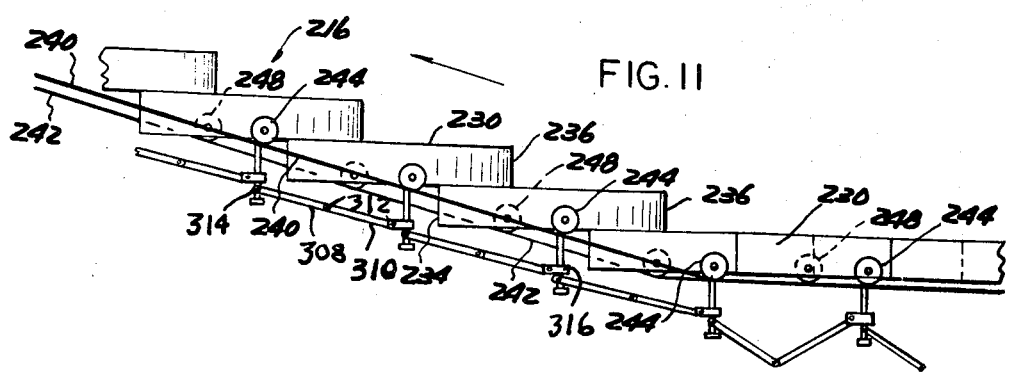
FIGURE 11 is a side view of the section of FIGURE 10 showing the unit moving in an upward direction.
Figure 12:
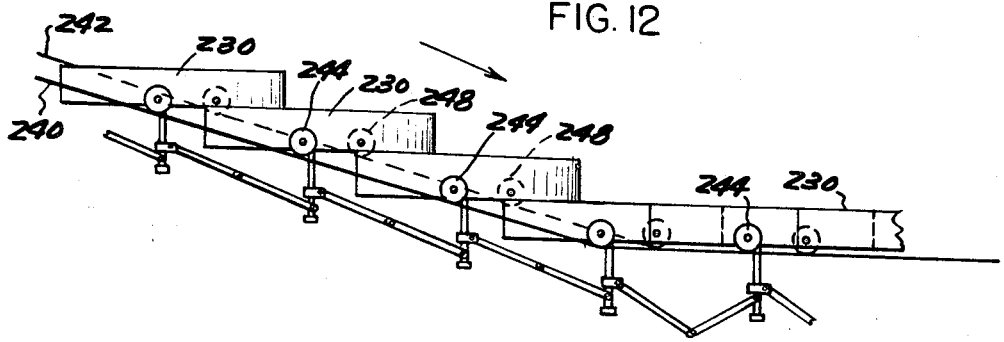
FIGURE 12 is a side view of the section of FIGURE 10 showing the unit moving in a downward direction.

The tracks 240 and 242 control the inclination of the top surface 230 of the pallet. In the straightaways 204 and 208, the outer and inner tracks 240 and 242 are both at the same level. When going up an incline as illustrated in FIGURE 11 the surface of the inner track 242 drops below the surface of the outer track 240 by a distance equal to the rise of the incline between the front wheels 244 and the rear wheels 248. This acts to maintain the pallets in a horizontal orientation while the pallets rise or fall with respect to their adjacent pallets. In descending an incline as shown in FIGURE 12, the outer track 240 falls below the inner track 242 so that adjacent pallets are displaced from one another in an upward direction, the direction of motion of the conveyor.

The pallets 230 are driven by a screw 260 powered by an electric motor 262 and the rail 218 is powered by a gear 264 from the other end of the screw in the same manner as the first embodiment.

The pallets each have downwardly depending guide bars 300 supported from their lower ends by means of screws 302 which pass through central apertures at the center of curvature of the convex section of the pallet. At their lower ends the guide bars 300 carry cam followers 304 which move between a pair of tracks 306 supported on the base of the unit. The pallets are connected together by a pair of link members 308 and 310 which are joined by a pivotal link 312 that is capable of motion in the vertical direction. The links 308 are joined to the lower ends of the guide bars 300 by pivotal joints 314 which allow freedom in the vertical direction. The links 310 are joined to the guide bars 300 by joints 316 which can pivot in either the vertical direction or the horizontal direction. The slack in the links 308 and 310, as illustrated in FIGURE 8, allows some motion of the pallets toward and away from one another to allow for the difference in distance between a pair of joints 316 when the pallets are on the incline and when they are on the horizontal. In this system the pushing action of the drive screw 260 is the main source of force on the pallets and it maintains the convex surface of one pallet in pushing relation to the concave surface of the next pallet. The lips 234 and 236 prevent vertical gaps from opening between the pallets as they move along the incline.

Having thus described our invention, we claim:

1. A conveyor section, comprising: an elongated base member; a plurality of stationary rolls disposed at spaced intervals adjacent to the base member so that a line passing perpendicularly to the axis of all the stationary rolls defines a closed course interior of the perimeter of the base; a plurality of pallets each having one convex and an opposed concave edge; link members each rigidly connected to one of the pallets and pivotally connected to an adjacent pallet so as to join the pallets into a continuous chain with the convex edge of one pallet in mating engagement with the concave edge of an adjacent pallet each of said pallets having an underside engaging with said stationary rolls so that said pallet chain is supported on the stationary rolls for movement along the closed course; a generally upright vertical median strip supported within the pallet chain and rising above the level of the pallets; and means for driving said pallet chain supported within said median.

2. The conveyor of claim 1 wherein an elongated continuous hand rail is supported on top of the median and is driven by the driving means for the pallet chain in timed relation to the motion of the chain.

3. The conveyor of claim 2 wherein the driving system for the conveyor and hand rail consists of a motor, drivingly connected to the chain, a right angle drive powered by the motor, a chain attached to the hand rail, and a gear driven by the right angle drive and in meshed engagement with the chain so as to rotate the hand rail in timed relation to the motion of the conveyor.

4. A power conveyor of the type described, comprising a plurality of pallets each having a flat surface bounded on one side by a convex edge and on the opposite side by a concave edge; links fixed to the undersurface of each of the pallets and extending parallel to the flat surface of the pallet beyond the pallet; a rotatable joint connecting the extreme end of each length to another pallet so that the pallets are joined in a continuous chain with a convex surface of one pallet disposed adjacent to the concave surface of the adjoining pallet; means for supporting the pallets for sliding motion about a closed course; guide means extending along the center of the closed course and connecting the pallets so as to allow the pallets to pivot about the center of the convex edges; means for powering at least one of the pallets of the chain to cause the chain to traverse the closed course; said means for supporting the pallets consisting of freely journalled stationary rolls disposed about horizontal axes and perpendicular to the course of motion of the conveyor with the undersurface of the pallets engaging the stationary rolls.

5. The conveyor of the type described comprising: a base member; a plurality of stationary rolls supported on horizontal axes above the base at spaced intervals so that a line perpendicular to the axes of all of the stationary rolls defines a closed course; a plurality of pallets supported on top of the stationary rolls with the underside of the pallets in engagement with the stationary rolls so that the pallets move along the stationary rolls, each of the pallets consisting of a plate having one convex edge and an opposite concave edge; links joining the pallets in a closed chain; each link being rigidly connected to the underside of one of the pallets and pivotally connected to the underside of an adjacent pallet so as to allow pivoting motion of one pallet with respect to an adjacent pallet about an axis passing through the center of the convex edge; and a drive screw disposed externally of the conveyor course with its axis parallel to the conveyor course and an adjacent section and above the level of the pallets, operative to engage the pallet as they pass the screw and to drive them along the closed course.

6. A conveyor of the type described comprising; a plurality of flat identical pallets each having one semi-circular convex edge and an opposed semi-circular concave edge; a continuous closed loop track for said conveyor; guide means fixed to the lower side of each pallet and projecting downwardly so as to engage said track, said guide means allowing said pallet to pivot about the center of the convex section; links each rigidly connected to one of the pallets and pivotally connected to an adjacent pallet so that the pallets form a closed chain with a convex edge of one pallet in abutment with the concave edge of an adjoining pallet, said pallets being supported on a closed loop path of stationary rolls, said stationary rolls being supported for rotation about axes disposed parallel to the surface of the pallets and perpendicular to the path of motion of the pallets and the underside of said pallets being in engagement with said stationary rolls whereby said pallets are movable along said stationary rolls.

7. A conveyor of the type described comprising; a plurality of pallets each consisting of a generally flat surface having one convex semi-circular edge and an opposed semi-circular concave edge; link members each rigidly attached to one pallet member and pivotally attached to another pallet member so as to form a closed chain with a convex surface of one pallet being in proximity to the concave surface of an adjoining pallet, the center of pivot of each of the links with one of the pallet members passing through the center of the convex section of the pallet; closed loop guide means defining a path for the pallets, a connecting rod joining the pallets to the guide means and allowing the pallet to pivot in respect to the guide means about an axis passing through the center of the convex section and means for supporting the pallets on their path, said supporting means comprising a plurality of freely journalled stationary rolls carried within and defining said closed loop guide means with said pallets having their underside resting upon said rolls to be movable there along and driving means operative to power said pallet chain over said stationary rolls.

8. A conveyor section comprising an elongated base member; a plurality of stationary rolls disposed at adjacent intervals adjacent to the base member so that a line passing perpendicular to the axis of all the stationary rolls defines a closed course interior of the perimeter of the base; said stationary rolls being freely journalled, a plurality of pallets having their undersides upon said stationary rolls to be movable there along; link members each rigidly connected to a pallet and pivotally connected to an adjacent pallet so as to join the pallets in a continuous chain for movement on said stationary rolls along the closed course and means for driving said pallet chain.

References Cited

UNITED STATES PATENTS

| | | | |
|---|---|---|---|
| 81,677 | 9/1868 | Pearce | 104—183 |
| 881,788 | 3/1908 | Gardner et al. | 104—67 |
| 906,945 | 12/1908 | Seeberger | 198—16 |
| 1,294,701 | 2/1919 | Pickard | 104—53 |
| 1,793,498 | 2/1931 | L'Heritier | 104—25 |
| 2,058,379 | 10/1936 | Handy | 198—16 |
| 2,373,764 | 4/1945 | Lautrup | 198—16 |
| 2,756,686 | 7/1956 | Kendall | 104—25 |
| 3,136,266 | 6/1964 | Seidman | 104—25 |
| 3,185,108 | 5/1965 | Muller | 104—25 |

ARTHUR L. LA POINT, *Primary Examiner.*

D. F. WORTH, *Assistant Examiner.*